United States Patent
Ohta

Patent Number: 5,216,304
Date of Patent: Jun. 1, 1993

[54] SPINDLE MOTOR WITH AN IMPROVED HUB

[75] Inventor: Kihachiro Ohta, Naka, Japan

[73] Assignee: Nippon Densan Corporation, Kyoto, Japan

[21] Appl. No.: 780,145

[22] Filed: Oct. 21, 1991

[30] Foreign Application Priority Data

Oct. 20, 1990 [JP] Japan ............................ 2-282887
Oct. 31, 1990 [JP] Japan ............................ 2-296577

[51] Int. Cl.$^5$ ............... G11B 17/14; H02K 7/14; H02K 5/10
[52] U.S. Cl. ............................... 310/67 R; 310/88; 360/98.08
[58] Field of Search ................ 310/67 R, 88, 89, 157, 310/268; 360/98.08, 99.05, 99.12; 369/270; 427/292, 239, 304

[56] References Cited

U.S. PATENT DOCUMENTS

| | | | |
|---|---|---|---|
| 4,088,001 | 5/1978 | Ishikawa et al. | 72/370 |
| 4,734,606 | 3/1988 | Hajec | 310/67 R |
| 4,739,425 | 4/1988 | Dierkes et al. | 360/98.08 |
| 4,739,427 | 4/1988 | Kilmer et al. | 360/98.08 |
| 4,967,465 | 11/1990 | Frank | 310/270 |
| 5,031,061 | 7/1991 | Hatch | 360/98.08 |
| 5,092,144 | 3/1992 | Fleming et al. | 70/95 |
| 5,097,164 | 3/1992 | Nakasugi et al. | 310/88 |

*Primary Examiner*—Steven L. Stephan
*Assistant Examiner*—C. LaBalle
*Attorney, Agent, or Firm*—McCormick, Paulding & Huber

[57] ABSTRACT

A spindle motor has a stationary member, a hub rotatable relative to the hub, a stator mounted on the stationary member and a rotor magnet carried by the hub and facing the stator. The hub is provided with female-threaded holes for receiving screws for fixing a disk clamp member to the hub, and also with communication holes communicating with the female-threaded holes and opening to the exterior of the hub. The hub further has a seal member for sealing the openings of the communication holes. The hub is rotatably supported by the shaft member through a pair of bearings. The stator has a stator stack of a stack height or thickness greater than the spacing of the pair of bearings.

4 Claims, 4 Drawing Sheets

SPINDLE MOTOR WITH AN IMPROVED HUB

FIELD OF THE INVENTION

The present invention relates to a spindle motor for rotatingly driving a recording disk such as a magnetic recording disk.

DESCRIPTION OF THE RELATED ART

In general, a spindle motor has a stationary member which is mounted on the frame of a disk drive device and a hub which is rotatable relative to the stationary member and on which a recording disk is mounted. The stationary member carries a stator having a coil, while the hub carries a rotor magnet opposing the stator.

This known spindle motor suffers from the following problems in connection with the structure for mounting a recording disk. The hub is provided with a plurality of female-threaded holes which are spaced in the circumferential direction. A clamp member for fixing the disk is mounted to the hub by means of fixing screws driven into the female-threaded holes. Usually, the hub has been subjected to a surface treatment such as anti-rust treatment, If the female-threaded holes were closed at their ends, the treating liquid does not fully fill these holes, which makes it difficult to treat substantially the whole area of the hub surface. To obviate this problem, it has been proposed to form the female-threaded holes such that these holes fully penetrate the wall of the hub. The spindle motor incorporating a hub provided with such female-threaded through-holes, however, encounters with a problem in that these female-threaded through holes cannot be sealed completely despite any sealing means charged in such holes, which undesirably allows impurities or foreign matters suspended by the atmosphere inside the spindle motor, e.g., mist of lubricant or grease, to leak through these holes from the interior of the spindle motor into the disk chamber.

Meanwhile, a current trend for miniature spindle motors has given a rise to the demand for a reduction in the size of the hub as a component of the spindle motor. This inevitably leads to a reduction in the internal volume of the hub, as well as reduction in the space for mounting the rotor magnet and the stator. A corresponding reduction in the size of bearing members undesirably reduces the rigidity of the bearing members, resulting in a shortened life of the spindle motor. On the other hand, a reduction in the span or distance between the bearing members makes it difficult to preserve s space large enough for forming a magnetic circuit, which makes it difficult to obtain a large output power or torque of the spindle motor.

SUMMARY OF THE INVENTION

Accordingly, it is a first object of the present invention to provide a spindle motor which enables the surface of the hub to be sufficiently treated and which can keep the disk chamber clean.

It is a second object of the present invention to provide a spindle motor which can have a reduced size while maintaining large output torque.

To this end, according to one aspect of the present invention, there is provided a spindle motor, comprising: a stationary member; a hub rotatable relative to the stationary member and having a plurality of female-threaded holes formed therein for receiving fixing screws for fixing a disk clamp member to the hub; a stator mounted on the stationary member; a rotor magnet carried by the hub so as to face the stator; communication hole means formed in the hub so as to extend in the radial direction of the hub in communication with the female-threaded holes; and a seal member associated with the hub so as to seal opening of the communication hole means.

According to another aspect of the invention, there is provided a spindle motor having a stationary shaft member, a hub rotatably carried by the stationary shaft through a pair of bearings, a rotor magnet secured to the hub, and a stator mounted on the shaft member so as to face the rotor magnet, wherein the improvement comprises that the stator includes a ring-shaped member fixed to a portion of the shaft member between the pair of bearings and a stator stack provided on the outer periphery of the ring-shaped member si as to be positioned radially outside the pair of bearings, the stator stack having a stack thickness greater than the spacing between the pair of bearings.

These and other objects, features and advantages of the present invention will become clear from the following description when the same is read in conjunction with the accompanying drawings.

DESCRIPTION OF THE PREFERRED EMBODIMENTS

Preferred embodiments of the spindle motor in accordance with the present invention will be described with reference to the accompanying drawings.

FIRST EMBODIMENT

Figure 1:
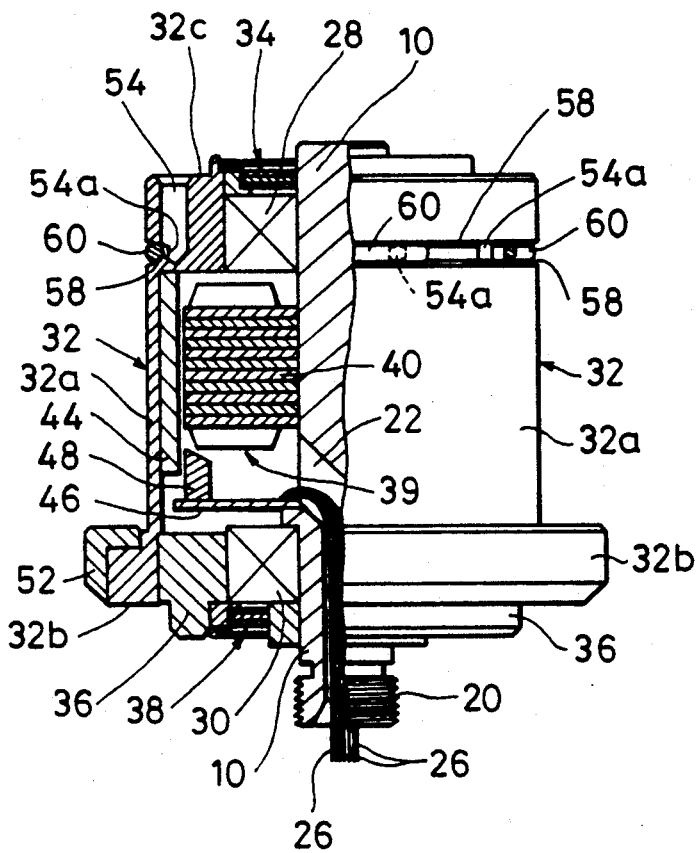
FIG. 1 is a partly-sectioned elevational view of a spindle motor in accordance with the present invention.
Figure 2:
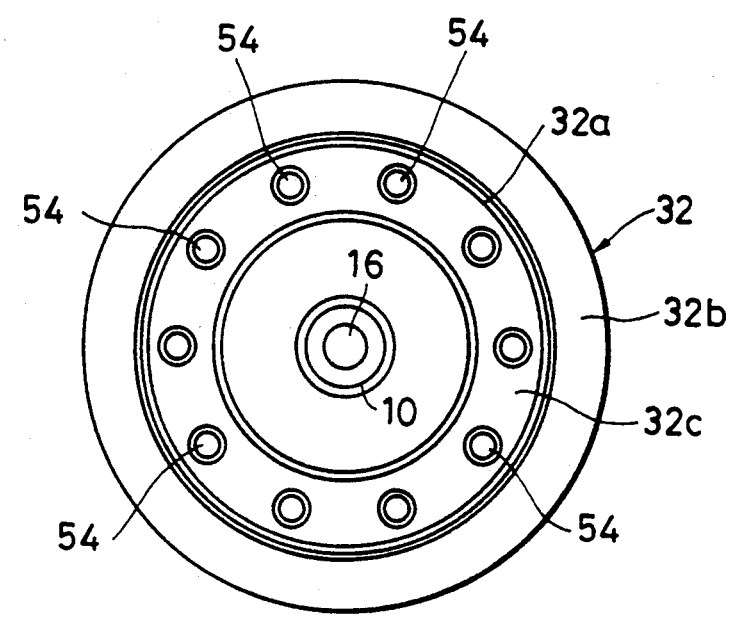
FIG. 2 is a plan view of a spindle motor shown in FIG. 1.
Figure 3:
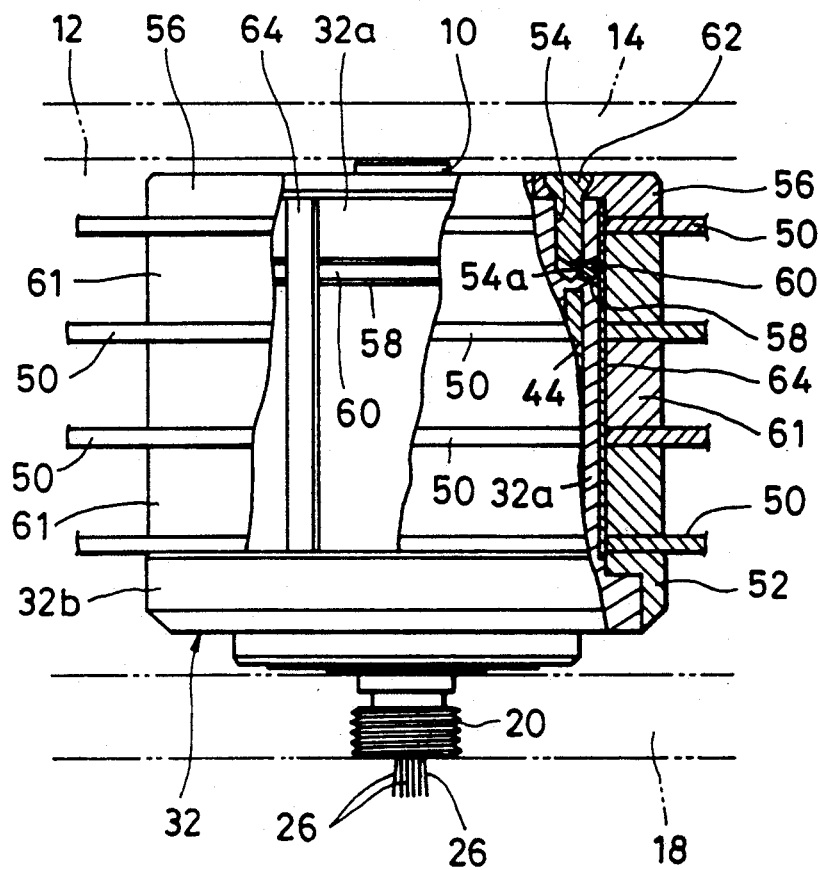
FIG. 3 is a partly-sectioned elevational view of the spindle motor of FIG. 1 carrying recording disks.

FIGS. 1 to 3 show a first embodiment of the spindle motor of the present invention.

Referring to FIG. 1, a spindle motor has a stationary shaft 10 which serves as a stationary member. The stationary shaft 10 is made of a ferromagnetic material and is provided at its lower end with a male-threaded portion 20 which is to be screwed into a threaded hole formed in a base plate 18 (see FIG. 3) of a disk drive device. The stationary shaft 10 also is provided with a communication hole 22 through which lead lines from a later-mentioned circuit board are led. As will be seen from FIG. 3, the base plate 18 cooperates with a cover plate 14 in defining a disk chamber 12 in which the spindle motor is disposed.

The stationary shaft 10 rotatably carries a rotor hub 32 through the intermediary of a pair of bearings 28 and 30. The inner races of the bearings 28 and 30 are fixed to the stationary shaft 10. The outer race of the bearing 28 is fixed to the inner peripheral surface of the rotor hub 32 at the upper end of the rotor hub 32 as viewed in the drawings, and a magnetic fluid seal 34 is disposed above the outer race of the bearing 28. A bush 36 is fixed between the outer race of the other bearing 30 and the inner peripheral surface of the rotor hub 32 at the lower end of the rotor hub 32. A magnetic fluid seal 38 is provided beneath the outer race of the bearing 30.

A stator 39 is disposed in the space which is defined by the hub 32 and the pair of bearings 28, 30. The stator 39 has a stator coil 40 which is fixed to the stationary shaft 10, and a coil 42 is wound on the stator core 40. A rotor magnet 44, which is secured to the inner peripheral surface of the hub 32, faces the stator 39.

A circuit board 46 also is disposed in the space inside the motor. The circuit board 46 is fixed to the stationary shaft 10 and is provided on the surface thereof with a hall element 48 for producing a signal indicative of the rotational angular position of the rotor magnet 44.

The rotor hub 32 has a disk holding cylindrical portion 32a which is made of an iron-based material and which has a peripheral surface on which the inner peripheral surface of a recording disk 50, e.g., a hard disk, is to be fitted. The rotor hub 32 also has a flange portion 32b which extends radially outward from the lower end of the holding cylindrical portion 32a as viewed in the drawings. A ring-shaped member which is made of an easily workable material such as aluminum or an aluminum alloy is provided on the outer periphery of the flange portion 32b. The recording disk 50 is placed on the top surface of the ring-shaped member 52 una manner which will be described later.

The rotor hub 32 also has an end wall 32c having a plurality of female-threaded holes 54 arranged at a constant circumferential interval as shown in FIG. 2. In the illustrated embodiment, there are 10 female-threaded holes 54. These female-threaded holes 54 open in the external surface of the end wall 32c of the rotor hub 32, i.e., on the upper surface of the rotor hub 32 as viewed in FIGS. 1 and 3, so as to extend in the direction of axis of the rotor hub 32. These female-threaded holes 54 do not fully penetrate the end wall 32c so that they do not provide any communication between the interior of the motor and the disk chamber. A clamp member 56 is fixed to the rotor hub 32 by means of fixing screws 62 driven into the female threaded holes 54.

An annular groove 58 having a suitable cross-section, e.g., a substantially U- or V-shaped cross-section, is formed in the outer peripheral surface of the cylindrical portion 32a of the rotor hub 32. The annular groove 58, which functions as an annular recess, need not always be continuous over the entire circumference but may be discontinuous, although the groove 58 is continuous in the illustrated embodiment.

Each female-threaded hole 54 communicated at its bottom with the annular groove 58 through a radially extending communication hole 54a. In other word, each communication hole 54a has one end opening in the end of the associated female-threaded hole and the other end opening in the annular groove 58. In the illustrated embodiment, the annular groove 58 has a large radial depth so that the radially inner end portion of the annular groove 58 serves as the communication holes 54a.

The rotor hub 32 is treated by, for example, being plated with nickel substantially over the entire area thereof. The plating as the surface treatment can be performed by various plating methods. In order to ensure that the whole area including the walls of the female-threaded holes 54 and the annular groove 58 be plated, it is preferred to use electrode-less plating method.

In the illustrated embodiment, the female-threaded holes 54 formed in the hub 32 communicate with the exterior of the cylindrical portion 32a of the hub 32 through the communication holes 54a and the annular groove 58, so that any surface-treating solution is allowed to flow along the female-threaded holes 54 and the communication holes 54a, so that the entire surface of the hub 32 including the inner end portions of the female-threaded holes 54a can be treated without fail.

A seal member is mounted in the annular groove 58. In the illustrated embodiment, the seal member is formed by an "O" ring 60 made of a rubbery material and is press-fitted in the annular groove 58. The "O" ring 60 completely covered and seals the openings of the communication holes 54a opening to the exterior of the cylindrical portion 32, so as to prevent discharge of foreign matters, e.g., metal dust generated when the fixing screws 62 are screwed as described later, from coming into the disk chamber 12.

Referring particularly to FIG. 3, the recording disks 50 are mounted on the hub 32 through the intermediary of shims 64. The shim 64 may be segments of a tape of polytetrafluoroethylene arranged along the cylindrical portion 32a of the hub 32 substantially at a 60° interval.

The recording disks 50 are fitted on the outer peripheral surface of the holding cylindrical portion 32a of the hub 32 from the upper end of the cylindrical portion 32a as viewed in the drawings, and are fixed to the rotor hub 32 by means of spacers which are placed between adjacent disks 50 and a clamp member 56 which is fastened to the rotor hub 32 by means of screws 62. There is a large difference in the thermal expansion coefficient between the material of the holding cylindrical portion 32a and the aluminum or aluminum alloy which is the major material of the disks 50. This, however, does not cause ant play of the disks 50 or deformation of the same due to temperature variation, because any force which would cause such play or deformation is absorbed by the shims 64.

In the illustrated embodiment, the plating treatment can easily be performed without fail over the entire area of the surface of the rotor hub 32 including inner end portions of the female-threaded holes 54, owing to the fact that the female-threaded holes 54 communicate at their ends 54 with the annular groove 58 by way of the communication holes 54a. This ensures that the effect of the plating treatment, e.g., rust prevention effect, is performed over the entire portion of the rotor hub 32, thus preventing invasion of the disk chamber 12 by foreign matters such as dust which may be freed from the material of the rotor hub 32 when the latter has become rusty.

It is also to be understood that oil mist, dust and other matters in the motor cannot reach the disk chamber 12 through the female-threaded holes 54 because the female-threaded holes do not penetrate into the interior of the motor.

Furthermore, metal dust and other matters, which may be produced when the screws 62 are driven into the female-threaded holes 54 for the purpose of fixing the clamp member 56, are prevented from coming into the disk chamber 12 because such matters are blocked by the sealing member such as the "O" ring 60 which covers and seals the openings of the communication holes 54a.

SECOND EMBODIMENT

Figure 4:
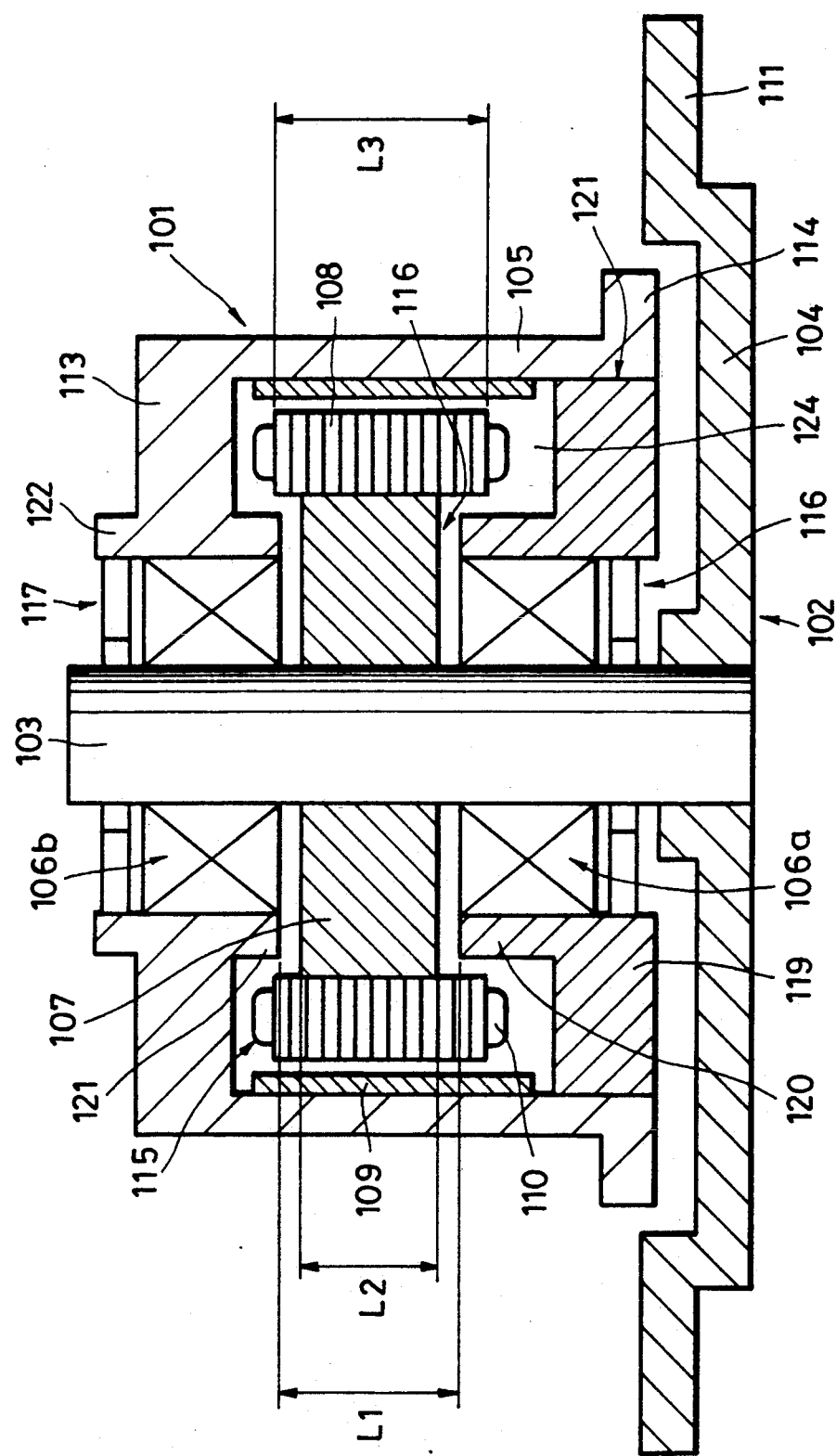
FIG. 4 is a schematic sectional view of a second embodiment of the spindle motor in accordance with the present invention.

FIG. 4 shows a second embodiment of the spindle motor in accordance with the present invention.

Referring to FIG. 4, the spindle motor has a stationary member 102 such as a bracket and a hub 101 rotatable relative to the stationary member 102. The stationary member 102 has a substantially cylindrical form and is provided on the outer periphery thereof with a flange 111 which is secured to a support frame (not shown) of a disk drive device. A shaft member 103 is fixed at its one end, lower end in the illustrated embodiment, to substantially the central portion of the stationary member 102. The shaft member 103 extends from the stationary member 102 substantially vertically. In the illustrated embodiment, both ends of ht shaft member 103 rotatably support a hub 101 through the intermediary of a pair of bearings 106a and 106b. The arrangement, however, may be such that the bracket is neglected while one end of the shaft member 103 is used as the stationary member, as in the preceding embodiment.

The hub 101 has a holding cylindrical portion 105 both ends of which are rotatably supported by the shaft member 103 through the bearings 106a and 106b as explained above. More specifically, in this embodiment, a ring-shaped bush 112 fits on the inner peripheral surface of the cylindrical portion 105 at one end of the latter, and the bearing 106a carries this bush 112. The cylindrical portion 105 has an end wall 113 on its end opposite to the end having the bush 112. The end wall 113 is directly borne by the other bearing 106b. A flange 114 is formed to extend radially outward from the outer peripheral surface of the cylindrical portion 105 at the end of the latter adjacent to the bush 112. A plurality of recording disks (not shown) such as magnetic disks are held between the flange 114 and a clamp member (not shown) fixed to the end wall 113 of the cylindrical portion 105, with spacers disposed between adjacent disks.

A rotor magnet 109 having a ring-shaped cross-section is mounted on the inner peripheral surface of the cylindrical portion 5 of the hub 111. A stator 115 is fixed to the shaft member 103 so as to face the rotor magnet 109. The stator and its associated parts will be described later n more detail.

Magnetic fluid seals 116 and 117 are disposed on the axially outer sides of the bearings 106a and 106b, respectively. The magnetic fluid seals 116 and 117 may be of the type known per se. For instance, each magnetic fluid seal may be of the type which has pole pieces mounted on the hub 101 and a magnetic fluid charged between the pole pieces and the shaft member 103 so as to prevent any oily content from the bearings 106a, 106b from coming into the disk chamber.

A description will now be given of the stator 115 and its associated parts. The stator 115 in the illustrated embodiment has a stator core 116 which includes an annular spacer member 107 and a stator stack 108 which is fixed to the outer peripheral surface of the spacer member 107. The thickness L2 of the spacer member 107 is determined to be smaller than th distance L1 between the pair of bearings 106a and 106b, i.e., to meet the condition of L1>L2. As will be seen from the drawings, the spacer member 107 is press-fitted on the portion of the shaft member 103 between the pair of bearings 106a, 106b. The spacer member 107 extends radially outward beyond the outer radial ends of the pair of bearings 106a, 106b, and the stator stack 108 is fixed to the thus extending radially outer end of the spacer member 107 by means of, for example, an adhesive. The stator stack 108 can be formed by laminating a plurality of thin metallic plates and the overall thickness L3 of the laminate structure, i.e., the thickness of the stator stack 108, is set to be greater than the distance L1 between the pair of bearings 106a and 106b, i.e., to meet the condition of L3>L1. The stator stack 108 us provided with a plurality of slots (not shown) which are filled with coils 110 wound in a manner known per se.

In order to realize a compact construction of the whole motor, the following constructions are adopted in one specific form of this embodiment. The bush 112 has an annular bush member 119 which is provided with a supporting projection 120 protruding upward as viewed in FIG. 4 from one end of the inner periphery thereof. The continuous inner peripheral surface of the bush member 119 and the supporting projection 120 bears against the bearing 106a. The magnetic fluid seal 116 also is provided on the inner peripheral surface of the bush member 119. The end wall 113 of the hub 101 is provided with inner peripheral supporting projections 121 and 122 which respectively protrude downward and upward as viewed in FIG. 4. Thus, the supporting projections 121, 122 and the end wall 113 have a common inner peripheral surface. The bearing 106 supports the portion of this common inner peripheral surface at levels corresponding to the lower supporting projection 121 and the end wall 113, while the magnetic fluid seal 116 is provided on the portion of the above-mentioned inner peripheral surface at the level of the outer supporting projection 122. As will be seen from FIG. 4, these structural features provide a comparatively large annular space 124 inside the hub 101, defined by the holding cylindrical portion 105, end wall 113, supporting projection 121, supporting projection 120 and the bush member 119. The rotor magnet 105, stator stack 108 and the coils 119 wound on the stator stack 108, which in cooperation form a magnetic circuit, are disposed in this space 124. The spacer member 107 maybe formed from a metallic material such as an iron-based metal or a synthetic resin such as polycarbonate.

In the second embodiment as described, the space member 107 is disposed between the pair of bearings 106a, 106b and the stator stack 108 is fixed to the radially outer end of the spacer member 107 so as to be positioned radially outside the bearings 106a, 106b. This arrangement enables the thickness L3 of the stator stack 108 to be determined materially irrespective of the spacing L1 between the pair of bearings 106a, 106b. Thus, the thickness L3 of the stator stack 108 can be set to be greater than the spacing L1 of the bearings, i.e., to meet the condition of L3>L1, thus making it possible to increase the number of turns of the stator coil winding, thus making it possible to obtain a spindle motor which is reduced in size but yet capable of producing sufficiently large output torque.

Although preferred embodiments of the spindle motor in accordance with the present invention have been described through specific terms, it is to be understood that the described embodiments are only illustrative and various changes and modifications may be imparted thereto without departing from the scope of the present invention which is limited solely by the appended claims.

We claim:

1. A spindle motor, comprising:
   a stationary member;
   a hub on which a recording disk is mounted;
   a rotor magnet mounted on the hub; and
   a stator mounted on said stationary member so as to face said rotor magnet; wherein said hub has a main body and an end wall provided at one end portion of the main body, a plurality of screw holes for securing a clamp member clamping said recording disk are provided in the end wall of the hub, communication hole means is formed corresponding to each of the plurality of screw holes, each communication hole means opens onto an outer circumferential surface of the hub, and a seal member is provided so as to seal the opening of the communication holes means.

2. A spindle motor according to claim 1, wherein said hub is provided with an annular recess formed in the outer peripheral surface thereof and said communication hole means opens in said annular recess, said seal member being received in said annular recess so as to seal the openings of said communication hole means in said annular recess.

3. A spindle motor according to claim 2, wherein said female-threaded holes are disposed at a substantially constant interval in the circumferential direction of said hub, and said communication hole means includes independent communication holes which are associated with respective female-threaded holes and which open in said annular recess.

4. A spindle motor according to claim 2, wherein said seal member includes an "O" ring tightly and elastically fitting in said annular recess.

* * * * *